Oct. 4, 1966 — J. T. M. WRIGHT ETAL — 3,276,286
CONTROL MECHANISM FOR VEHICLE TRANSMISSION SYSTEMS
Filed Aug. 17, 1964 — 3 Sheets-Sheet 1

United States Patent Office 3,276,286
Patented Oct. 4, 1966

3,276,286
CONTROL MECHANISM FOR VEHICLE
TRANSMISSION SYSTEMS
John Thomas Matthew Wright, Sutton Coldfield, and Brian Henderson Fantom, Knowle, England, assignors to Joseph Lucas (Industries) Limited, Birmingham, England
Filed Aug. 17, 1964, Ser. No. 390,149
1 Claim. (Cl. 74—481)

This invention relates to control mechanism for vehicle transmission systems of the kind comprising one or more hydraulic motors for driving the vehicle, and a swash plate type pump adapted to be driven by the engine of the vehicle for supplying motive liquid to the motor, or motors, the pump incorporating an angularly adjustable swash plate whereby the speed ratio between the engine and vehicle can be varied.

The object of the present invention is to provide a convenient form of control mechanism for a transmission system.

Figure 1:
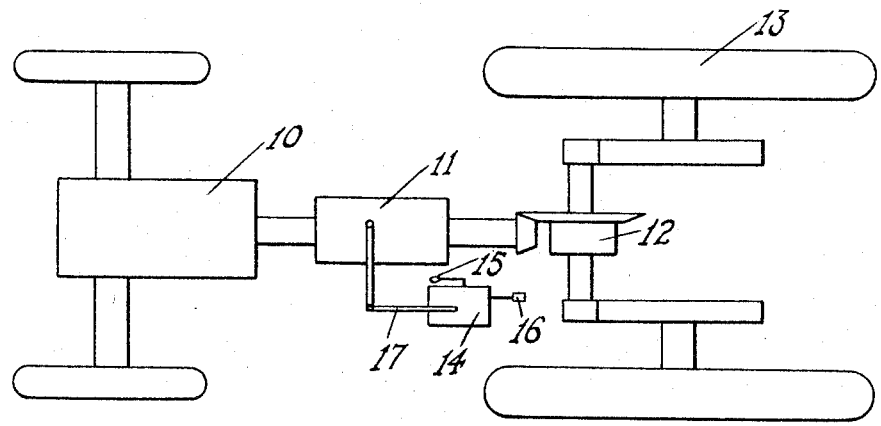
Figure 5:
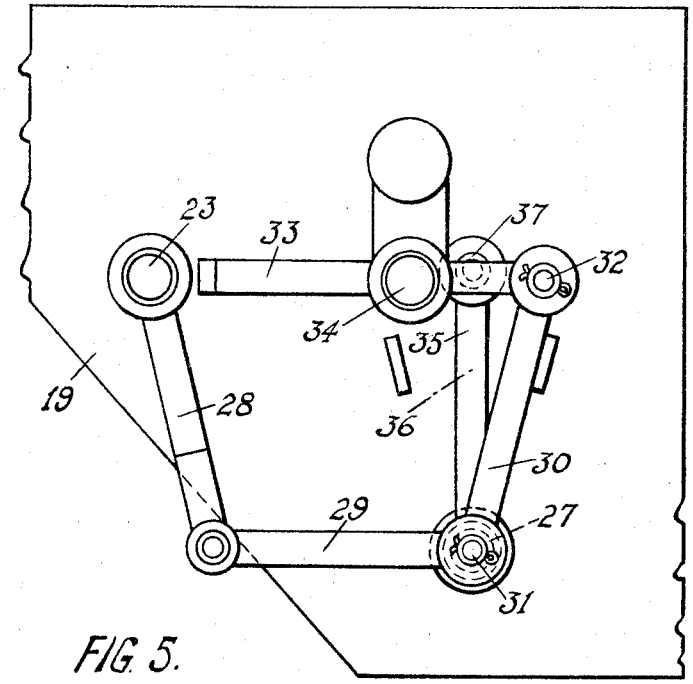
Figure 2:
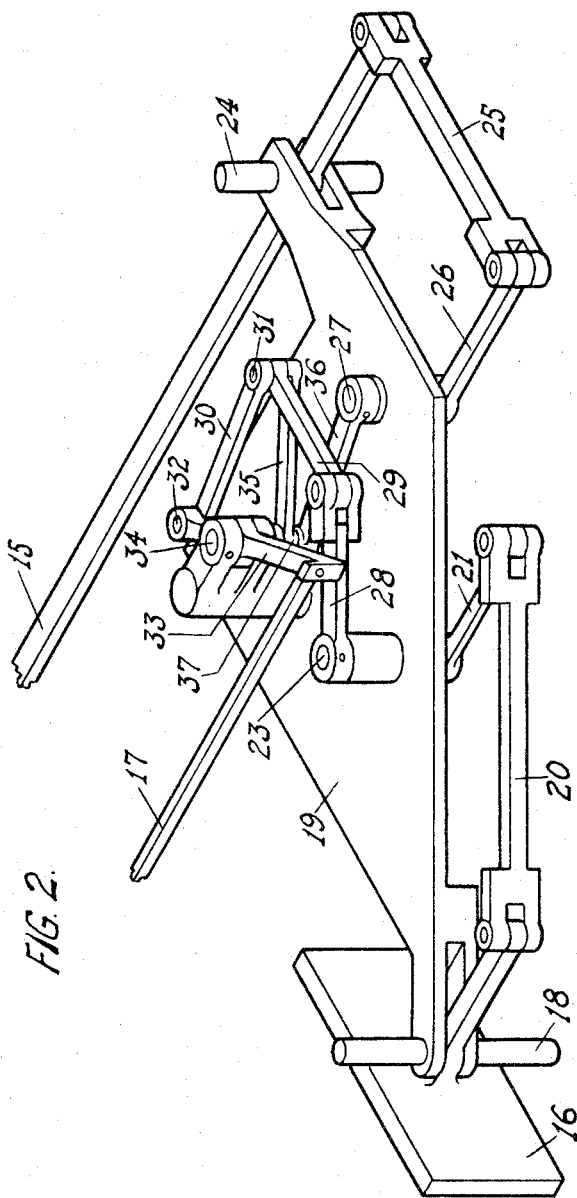
Figure 3:
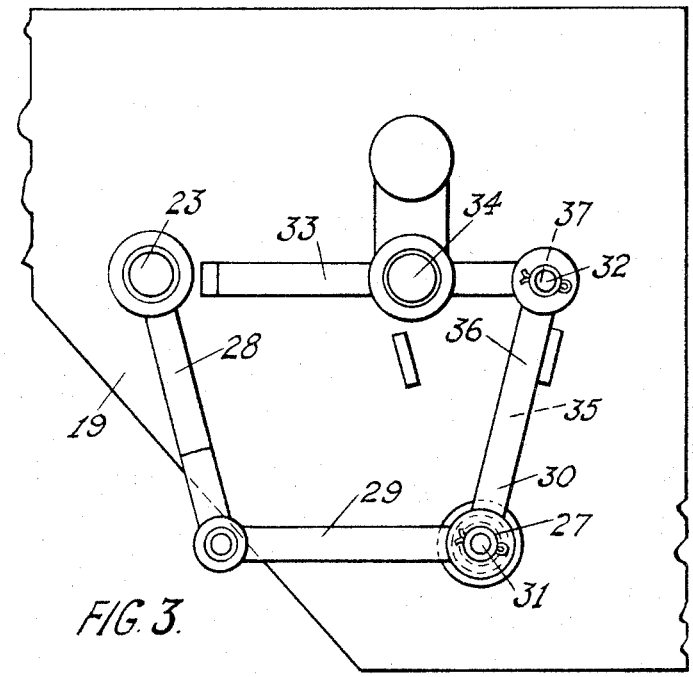
Figure 4:
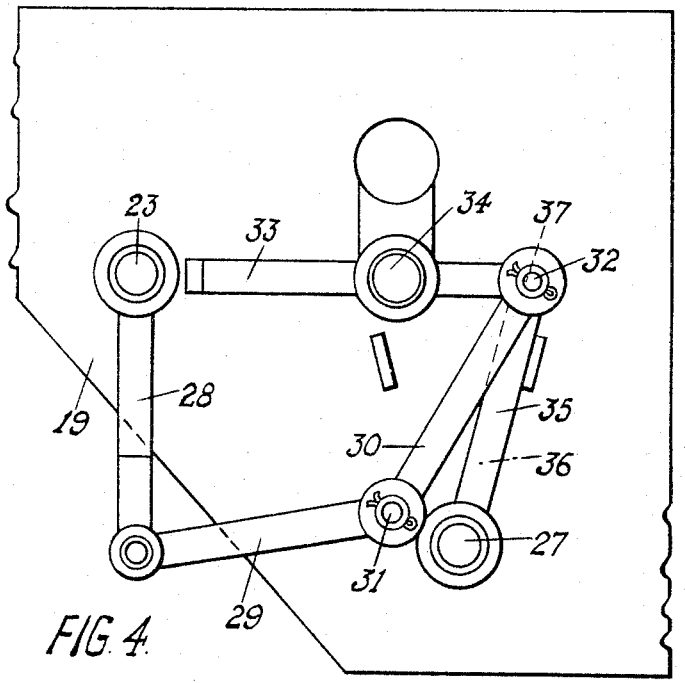

The invention will now be described, by way of example, with reference to the accompanying drawings in which:

FIGURE 1 is a diagrammatic representation of a tractor vehicle incorporating the present invention, FIGURE 2 is a perspective view of one example of the mechanism which forms the subject of this invention, and FIGURES 3, 4 and 5 show the mechanism in various positions.

This example of the invention is applied to a tractor vehicle having an engine 10, an hydraulic transmission mechanism 11 and a final drive assembly 12 driving a pair of rear wheels 13 of the vehicle. The transmission mechanism 11 includes an hydraulic pump of the swash plate type of which the angularity is adjustable to vary the stroke thereof and thus the quantity of motive liquid supplied to the motor or motors also incorporated in the transmission mechanism.

The angularity of the pump swash plate is adjustable by means of a control mechanism indicated generally at 14 in FIGURE 1 having a driver operable hand control lever 15 and a driver operable pedal 16. Between the control mechanism 14 and the transmission mechanism 11 is a linkage 17.

Referring to FIGURE 2 of the drawings, the pedal 16 is shown as being pivotal about a pin 18 mounted on a support plate 19. Connected to the pedal 16 is a linkage comprising two pivotally connected links 20, 21 (referred to as the pedal links). The link 21, remote from the pedal is pivotally mounted on the support plate 19 by a pin 23.

The hand control lever 15, on the other hand, is mounted on the support plate 19 by a pin 24 and has two pivotally connected links 25, 26, that link 26 remote from the hand control lever 15 being pivotally mounted on the support plate by a pin 27. (The links 25, 26, will be referred to as the hand control links.)

The linkage 17 to the transmission mechanism is capable of being operated either by the pedal 16 or the hand control lever 15. When used on a tractor, the pedal is normally used to control the sensitivity, that is the travel of the hand control lever with respect to the corresponding travel of the swash plate, and the hand control lever is used to control speed of the vehicle and also the direction of drive thereof.

The mechanism comprises a plurality of levers, all of the same length. A first lever 28 is pivotally mounted about the axis of the pin 23 and is fixed to this pin for movement in response to movement of the pedal links. Pivotally connected to the first lever 28 at a point removed from its pivot axis is one end of a first link 29 which is pivotally connected at its other end to one end of a second link 30 a pin 31 connecting these two links. The other end of the second link 30 is pivotally connected by the pin 32 to one free end of a second lever 33 which is secured to a pivot pin 34 movable about a fixed axis and disposed intermediate the ends of the second lever 33. The opposite free end of the second lever 33 remote from the second link 30 is connected to the linkage 17 to the transmission mechanism.

Pivotally connected at the point of pivotal interconnection between the first and second links 29, 30, is one end of a third link 35 which is pivotally connected at its opposite end to a third lever 36 by a pin 37. The third lever 36 is connected to the pin 27 and thus to the hand control links 25, 26.

FIGURES 3, 4 and 5 show various positions of the mechanism and in FIGURE 3 a neutral position is shown, corresponding to zero stroke of the pump. In this position, any movement of the pedal 16, for example to the position shown in FIGURE 4, without any movement of the hand control lever 15, will have no effect upon the second lever 33 and thus the transmission pump swash plate, through the linkage 17. Similarly movement of the hand control lever 15 from the neutral position of FIGURE 3, for example to the position in FIGURE 5, will have no effect upon the second lever 33. If, however, the mechanism is set at the position in FIGURE 4 by the pedal 16, the range of movement of the pump swash plate which can be achieved by the hand lever is limited by the permitted relatively small travel of the second lever 33. This travel is however symmetrical about the neutral position of the second lever 33 so that total travel of the hand control lever corresponds to one speed in one direction, through the neutral position, to the same speed in the opposite direction.

The same effect can be obtained by initially setting the hand control lever 15 as illustrated in FIGURE 5, sensitivity of the foot pedal 16 being thus determined, the pedal being used to control both speed and direction of drive.

Having thus described our invention what we claim as new and desire to secure by Letters Patent is:

I claim:

Control mechanism for a vehicle transmission system of the kind including at least one hydraulic driving motor, a pump, and an angularly adjustable swash plate incorporated in the pump, the control mechanism comprising in combination, a first driver operable means in the form of a first lever movable about a relatively fixed axis, a first link pivotally connected at one end to the first lever at a point removed from said fixed axis, a second link pivotally connected at one end to the other end of the first link, a second lever pivotally connected to the other end of the second link, said second lever being movable about a relatively fixed axis to adjust the angularity of the swash plate of the pump, and second driver operable means arranged to vary the position of the pivotal connection between the first and second links.

References Cited by the Examiner
UNITED STATES PATENTS
1,324,757   12/1919   Wilson _____ 74—481
1,576,717    3/1926   Catenaro _____ 74—481

MILTON KAUFMAN, *Primary Examiner.*